(12) United States Patent  
Olson

(10) Patent No.: US 6,962,494 B1  
(45) Date of Patent: Nov. 8, 2005

(54) TEACHING AID

(76) Inventor: Robyn Olson, 900 Cedar St. #202, El Segundo, CA (US) 90245

( * ) Notice: Subject to any disclaimer, the term of this patent is extended or adjusted under 35 U.S.C. 154(b) by 477 days.

(21) Appl. No.: 10/242,857

(22) Filed: Sep. 13, 2002

(51) Int. Cl.⁷ ............................................. G09B 19/12
(52) U.S. Cl. ......................... 434/304; 434/365; 368/63
(58) Field of Search ................. 434/257, 304, 434/307 R, 332, 365, 238; 368/45, 63, 223, 368/228, 10, 80; 446/157, 256, 265, 484

(56) References Cited

U.S. PATENT DOCUMENTS

| | | | | |
|---|---|---|---|---|
| 3,690,021 | A * | 9/1972 | Glass et al. ................. | 434/304 |
| 3,829,989 | A * | 8/1974 | Pecoraro ..................... | 434/304 |
| 3,835,640 | A | 9/1974 | Hughes, Jr. | |
| 4,015,346 | A * | 4/1977 | Ogasawara ................. | 434/304 |
| 4,368,046 | A * | 1/1983 | Bernick ...................... | 434/304 |
| 4,531,841 | A * | 7/1985 | Puff ............................ | 368/63 |
| D297,512 | S * | 9/1988 | Kowalenko et al. ......... | D10/22 |
| 4,799,890 | A * | 1/1989 | Thompson et al. ......... | 434/304 |
| 4,885,731 | A * | 12/1989 | Massaro ..................... | 368/228 |
| 5,030,104 | A * | 7/1991 | Caldwell .................... | 434/304 |
| 5,044,961 | A * | 9/1991 | Bruskewitz ................. | 434/304 |
| 5,105,397 | A * | 4/1992 | Whitney ..................... | 368/80 |
| 5,133,666 | A | 7/1992 | Levy | |
| 5,167,507 | A * | 12/1992 | Cobb et al. ................. | 434/304 |
| 5,239,523 | A * | 8/1993 | Chin-Hsing ................. | 368/63 |
| 5,288,233 | A * | 2/1994 | Green ......................... | 434/238 |
| 5,293,356 | A * | 3/1994 | Chin-Hsing ................. | 368/63 |
| 5,309,413 | A * | 5/1994 | Chan .......................... | 368/63 |
| 5,380,206 | A * | 1/1995 | Asprey ....................... | 434/257 |
| 5,604,717 | A * | 2/1997 | Wang ......................... | 368/223 |
| 5,662,479 | A * | 9/1997 | Rogers ....................... | 434/304 |
| 5,851,118 | A * | 12/1998 | Woldenberg et al. ....... | 434/304 |
| 6,030,228 | A | 2/2000 | Armstrong | |
| 6,071,124 | A * | 6/2000 | Ang et al. .................. | 434/304 |
| 6,201,769 | B1 * | 3/2001 | Lewis ......................... | 368/10 |
| 6,361,325 | B1 * | 3/2002 | McGuire ..................... | 434/304 |
| 6,406,301 | B2 * | 6/2002 | Richards ..................... | 434/304 |
| 6,614,727 | B2 * | 9/2003 | McGuire ..................... | 368/223 |

* cited by examiner

Primary Examiner—Joe H. Cheng

(57) ABSTRACT

A teaching aid for teaching a user how to tell time. The teaching aid includes a clock assembly comprising a face member and a plurality of arm members. The arm members is rotatably coupled to the face member of the clock assembly whereby the arm members are designed for indicating a time to the user when the arm members are rotated with respect to the face member. A clockwork assembly is operationally coupled to the arm members. The clockwork assembly is for rotating the arm members with respect to the face member for indicating the time of day. A stimulus assembly is operationally coupled to the clockwork assembly whereby the stimulus assembly is designed for providing audio and visual stimulus to the user to indicate the time.

8 Claims, 3 Drawing Sheets

TEACHING AID

BACKGROUND OF THE INVENTION

1. Field of the Invention

The present invention relates to talking alarm clocks and more particularly pertains to a new teaching aid for teaching a user how to tell time.

2. Description of the Prior Art

The use of talking alarm clocks is known in the prior art. U.S. Pat. No. 3,835,640 describes a system for producing an audible sound to wake a user. Another type of talking alarm clock is U.S. Pat. No. 5,133,666 having a clock face and indicator hands with enumeration to indicate the status of each of the indicator hands to aid in teaching a user to read a clock. U.S. Pat. No. 6,030,228 has a system for educating a user how to read the time from a clock.

While these devices fulfill their respective, particular objectives and requirements, the need remains for a device that has certain improved features to audibly indicate the time and visually show the user which of the indicators hands are being used.

SUMMARY OF THE INVENTION

The present invention meets the needs presented above by providing light emitting members in the arm members of the clock assembly that emit light to indicate which of the arm members is used to indicate the hours and minutes as the audio means indicates the time.

Still yet another object of the present invention is to provide a new teaching aid that provides a button member to allow the user to hear the time and have the arm members illuminated to indicate the time.

To this end, the present invention generally comprises a clock assembly comprising a face member and a plurality of arm members. The arm members is rotatably coupled to the face member of the clock assembly whereby the arm members are designed for indicating a time to the user when the arm members are rotated with respect to the face member. A clockwork assembly is operationally coupled to the arm members. The clockwork assembly is for rotating the arm members with respect to the face member for indicating the time of day. A stimulus assembly is operationally coupled to the clockwork assembly whereby the stimulus assembly is designed for providing audio and visual stimulus to the user to indicate the time.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
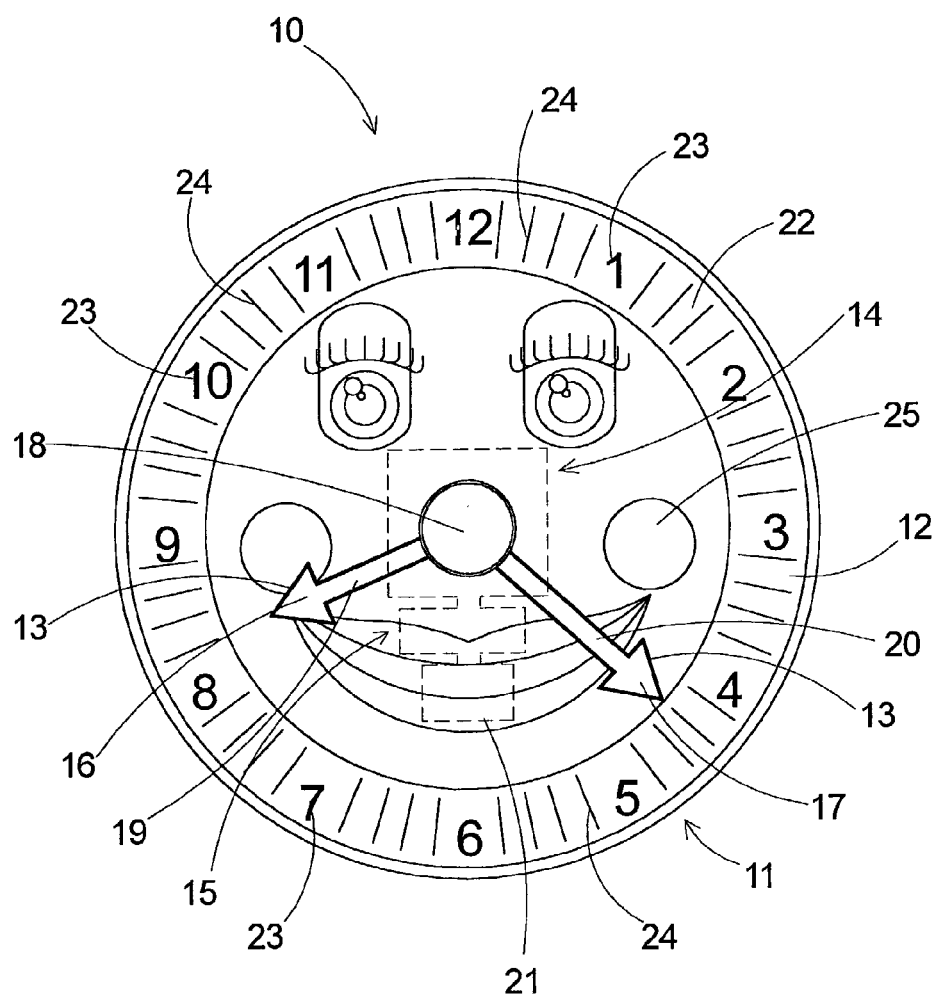
FIG. 1 is a front view of a new teaching aid according to the present invention.
Figure 2:
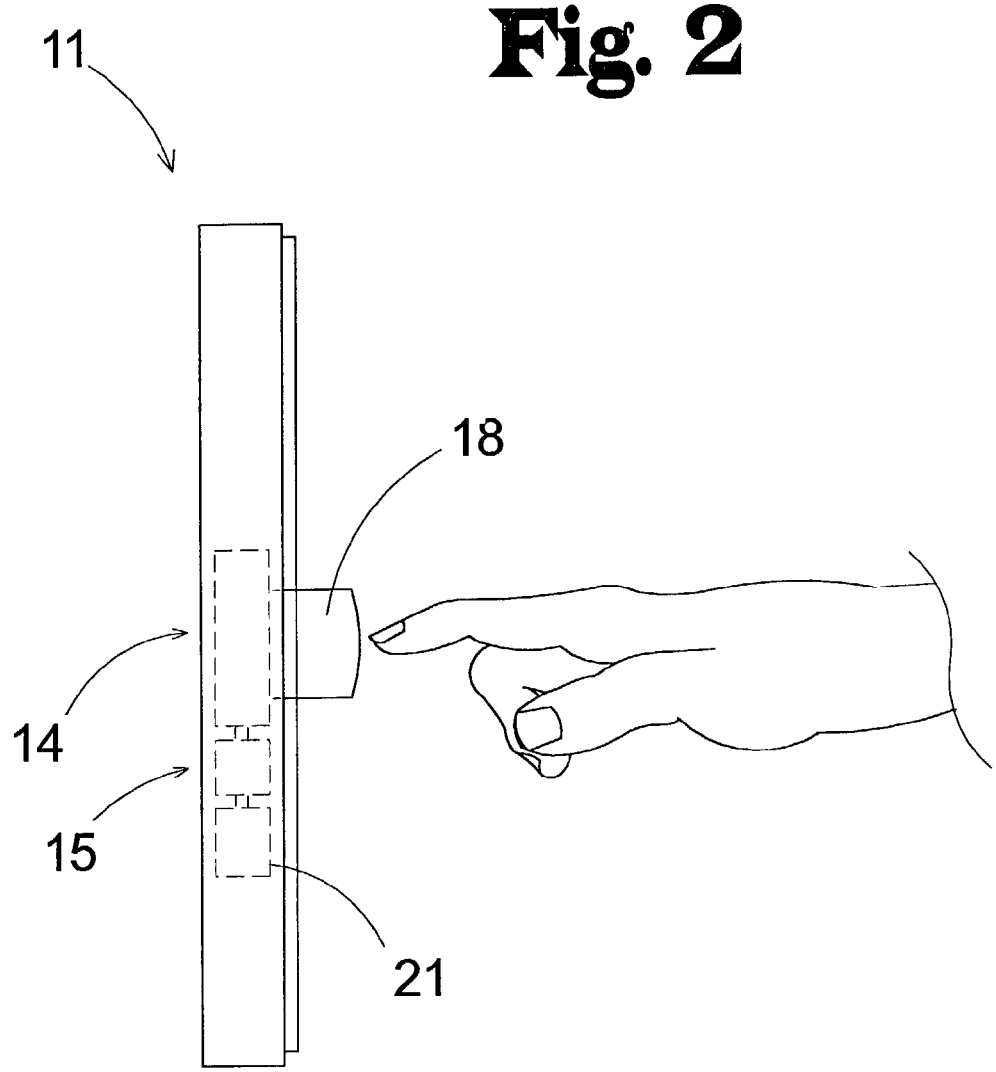
FIG. 2 is a side view of the present invention.
Figure 3:
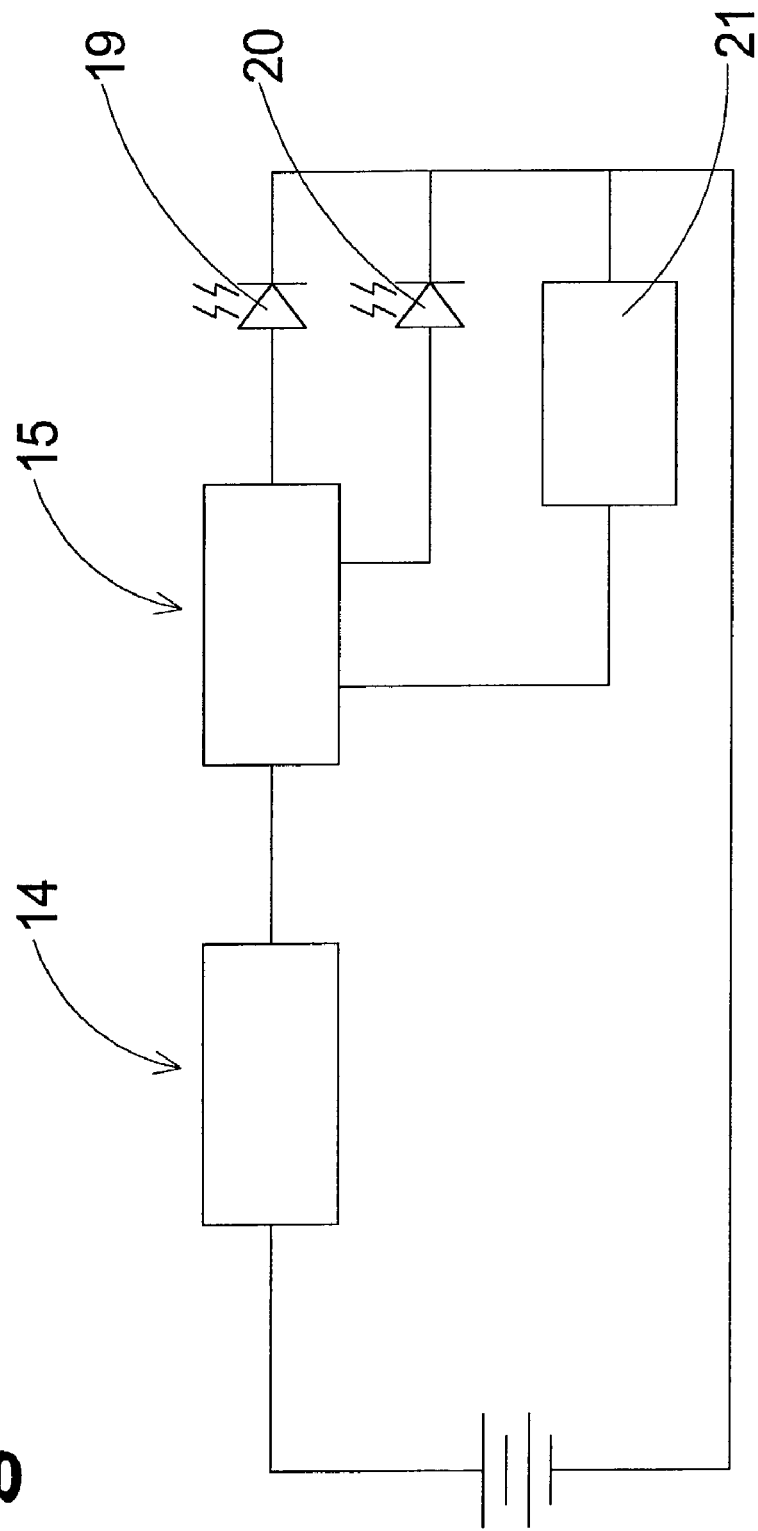
FIG. 3 is a schematic view of the present invention.

With reference now to the drawings, and in particular to FIGS. 1 through 3 thereof, a new teaching aid embodying the principles and concepts of the present invention and generally designated by the reference numeral 10 will be described.

As best illustrated in FIGS. 1 through 3, the teaching aid 10 generally comprises a clock assembly 11 comprising a face member 12 and a plurality of arm members 13. The arm members 13 are rotatably coupled to the face member 12 of the clock assembly 11 whereby the arm members 13 are designed for indicating a time to the user when the arm members 13 are rotated with respect to the face member 12.

A clockwork assembly 14 is operationally coupled to the arm members 13. The clockwork assembly 14 is for rotating the arm members 13 with respect to the face member 12 for indicating the time of day.

A stimulus assembly 15 is operationally coupled to the clockwork assembly 14 whereby the stimulus assembly 15 is designed for providing audio and visual stimulus to the user to indicate the time.

The arm members 13 comprise a hour arm member 16 and a minute arm member 17. The hour arm member 16 is operationally coupled to the clockwork assembly 14 whereby the hour arm member 16 is designed for indicating the hour when the hour arm member 16 is rotated by the clockwork assembly 14. The minute arm member 17 is operationally coupled to the clockwork assembly 14 whereby the minute arm member 17 is designed for indicating the when the minute arm member 17 is rotated by the clockwork assembly 14.

A button member 18 is slidably coupled to the face member 12 of the clock assembly 11. The button member 18 is operationally coupled to the stimulus assembly 15 whereby the stimulus assembly 15 is designed for audibly and visually indicating the time indicated by the minute arm member 17 and the hour arm member 16 of the clock assembly 11 to the user when the button member 18 is actuated by the user.

The hour arm member 16 of the clock assembly 11 comprises a first light emitting member 19. The first light emitting member 19 is operationally coupled to the stimulus assembly 15 whereby the first light emitting member 19 emits light to illuminate the hour arm member 16 when the button member 18 is pushed by the user and the stimulus audibly indicates the hour.

The minute arm member 17 of the clock assembly 11 comprises a second light emitting member 20. The second light emitting member 20 is operationally coupled to the stimulus assembly 15 whereby the second light emitting member 20 emits light to illuminate the minute arm member 17 when the button member 18 is pushed by the user and the stimulus audibly indicates the minutes. The stimulus assembly 15 may be configured to actuate the first light emitting member 19 and the second light emitting member 20 to emit light in a variety of configurations such as flashing or changing brightness and changing color to indicate the time of day.

An audio means 21 for audibly announcing the time indicated by the arm members 13 of the clock assembly 11.

The audio means 21 is operationally coupled to the stimulus assembly 15. The stimulus assembly 15 actuates the audio means 21 for audibly indicating the time when the button member 18 is actuated by the user.

The face member 12 of the clock assembly 11 comprises a time portion 22. The time portion 22 of the face member 12 has a plurality of hour indicia 23. The hour indicia 23 are for indicating the hour of the day when the hour arm member 16 is pointed to one of the hour indicia 23. The time portion 22 of the clock assembly 11 has a plurality of minute indicia 24. The minute indicia 24 are positioned between the hour indicia 23 of the time portion 22. The minute indicia 24 are for indicating the minute of the hour when the minute arm member 17 is pointed to one of the minute indicia 24.

The face member 12 of the clock assembly 11 has a face indicia 25. The face indicia 25 of the face member 12 is designed for representing a face for providing pleasant visual stimulus to the user. In an embodiment, the eyes of the face indicia 25 could be replaced with eye assemblies that recreate the eyes closing in response to a time set for the user to go to sleep and opening in response to a time set for the user to wake up.

In use, the user places the clock assembly 11 in a readily accessible area. When the user wishes to know the time the user presses the button member 18 and the audio means 21 verbally announces the hour and the first light emitting member 19 emits light to indicate the hour. The audio means 21 then verbally announces the minutes and the second light emitting member 20 emits lights to indicate the minutes. The audio produced by the audio means 21 and the light emitted by the first light emitting member 19 and the second light emitting member 20 help in teaching the user to tell the time.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A teaching aid for teaching a user how to tell time, the teaching aid comprising:
    a clock assembly comprising a face member and a plurality of arm members, said arm members being rotatably coupled to said face member of said clock assembly such that said arm members are adapted for indicating a time to the user when said arm members are rotated with respect to said face member;
    a clockwork assembly being operationally coupled to said arm members, said clockwork assembly being for rotating said arm members with respect to said face member for indicating the time of day;
    a stimulus assembly being operationally coupled to said clockwork assembly such that said stimulus assembly is adapted for providing audio and visual stimulus to the user to indicate the time;
    said arm members comprising a hour arm member and a minute arm member, said hour arm member being operationally coupled to said clockwork assembly such that said hour arm member is adapted for indicating the hour when said hour arm member is rotated by said clockwork assembly, said minute arm member being operationally coupled to said clockwork assembly such that said minute arm member is adapted for indicating the minute when said minute arm member is rotated by said clockwork assembly; and
    a button member being slidably coupled to said face member of said clock assembly, said button member being operationally coupled to said stimulus assembly such that said stimulus assembly is adapted for audibly and visually indicating the time indicated by said minute arm member and said hour arm member of said clock assembly to the user when said button member is actuated by the user, said minute arm member and said hour arm member being rotated around said button member to allow the user to see said minute arm member and said hour arm member when said button member is actuated.

2. The teaching aid as set forth in claim 1, further comprising:
    said hour arm member of said clock assembly comprising a first light emitting member, said first light emitting member being operationally coupled to said stimulus assembly such that said first light emitting member emits light to illuminate said hour arm member when said button member is pushed by the user and said stimulus audibly indicates the hour.

3. The teaching aid as set forth in claim 1, further comprising:
    said minute arm member of said clock assembly comprising a second light emitting member, said second light emitting member being operationally coupled to said stimulus assembly such that said second light emitting member emits light to illuminate said minute arm member when said button member is pushed by the user and said stimulus audibly indicates the minutes.

4. The teaching aid as set forth in claim 1, further comprising:
    an audio means for audibly announcing the time indicated by said arm members of said clock assembly, said audio means being operationally coupled to said stimulus assembly, said stimulus assembly actuating said audio means for audibly indicating the time when said button member is actuated by the user.

5. The teaching aid as set forth in claim 1, further comprising:
    said face member of said clock assembly comprising a time portion, said time portion of said face member having a plurality of hour indicia, said hour indicia being for indicating the hour of the day when said hour arm member is pointed to one of said hour indicia.

6. The teaching aid as set forth in claim 5, further comprising:
    said time portion of said clock assembly having a plurality of minute indicia, said minute indicia being positioned between said hour indicia of said time portion, said minute indicia being for indicating the minute of the hour when said minute arm member is pointed to one of said minute indicia.

7. The teaching aid as set forth in claim 1, further comprising:
    said face member of said clock assembly having a face indicia, said face indicia of said face member being adapted for representing a face for providing pleasant visual stimulus to the user.

8. A teaching aid for teaching a user how to tell time, the teaching aid comprising:
- a clock assembly comprising a face member and a plurality of arm members, said arm members being rotatably coupled to said face member of said clock assembly such that said arm members are adapted for indicating a time to the user when said arm members are rotated with respect to said face member;
- a clockwork assembly being operationally coupled to said arm members, said clockwork assembly being for rotating said arm members with respect to said face member for indicating the time of day;
- a stimulus assembly being operationally coupled to said clockwork assembly such that said stimulus assembly is adapted for providing audio and visual stimulus to the user to indicate the time;
- said arm members comprising a hour arm member and a minute arm member, said hour arm member being operationally coupled to said clockwork assembly such that said hour arm member is adapted for indicating the hour when said hour arm member is rotated by said clockwork assembly, said minute arm member being operationally coupled to said clockwork assembly such that said minute arm member is adapted for indicating the minute when said minute arm member is rotated by said clockwork assembly;
- a button member being slidably coupled to said face member of said clock assembly, said button member being operationally coupled to said stimulus assembly such that said stimulus assembly is adapted for audibly and visually indicating the time indicated by said minute arm member and said hour arm member of said clock assembly to the user when said button member is actuated by the user, said minute arm member and said hour arm member being rotated around said button member to allow the user to see said minute arm member and said hour arm member when said button member is actuated;
- said hour arm member of said clock assembly comprising a first light emitting member, said first light emitting member being operationally coupled to said stimulus assembly such that said first light emitting member emits light to illuminate said hour arm member when said button member is pushed by the user and said stimulus audibly indicates the hour;
- said minute arm member of said clock assembly comprising a second light emitting member, said second light emitting member being operationally coupled to said stimulus assembly such that said second light emitting member emits light to illuminate said minute arm member when said button member is pushed by the user and said stimulus audibly indicates the minutes;
- an audio means for audibly announcing the time indicated by said arm members of said clock assembly, said audio means being operationally coupled to said stimulus assembly, said stimulus assembly actuating said audio means for audibly indicating the time when said button member is actuated by the user;
- said face member of said clock assembly comprising a time portion, said time portion of said face member having a plurality of hour indicia, said hour indicia being for indicating the hour of the day when said hour arm member is pointed to one of said hour indicia;
- said time portion of said clock assembly having a plurality of minute indicia, said minute indicia being positioned between said hour indicia of said time portion, said minute indicia being for indicating the minute of the hour when said minute arm member is pointed to one of said minute indicia; and
- said face member of said clock assembly having a face indicia, said face indicia of said face member being adapted for representing a face for providing pleasant visual stimulus to the user.

* * * * *